Figure 1:
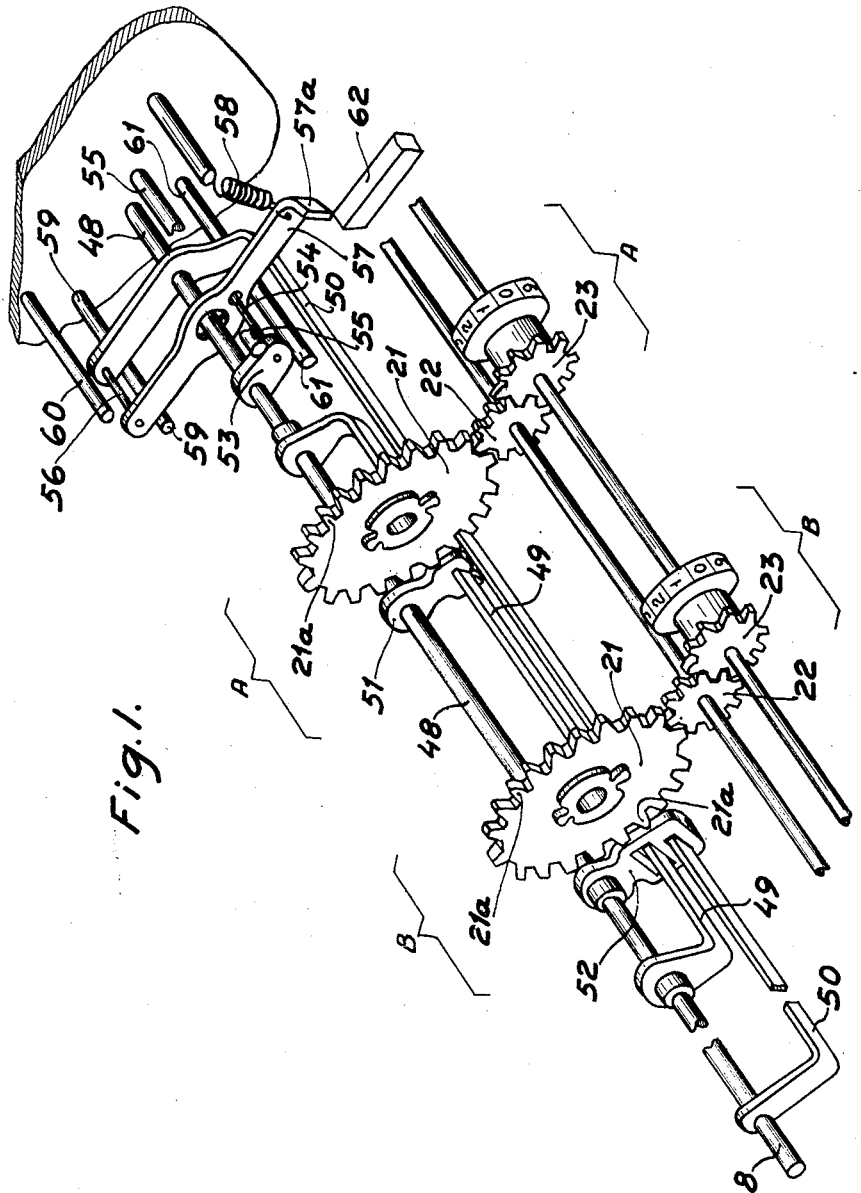

May 22, 1951

S. TOORELL 2,553,884

OVERDRAFT SENSING AND CONTROL MECHANISM FOR
CRAWL-CARRY ACCUMULATORS

Filed April 26, 1948

3 Sheets-Sheet 1

Inventor:
Sture Toorell
by Jarvis C. Marble
his attorney

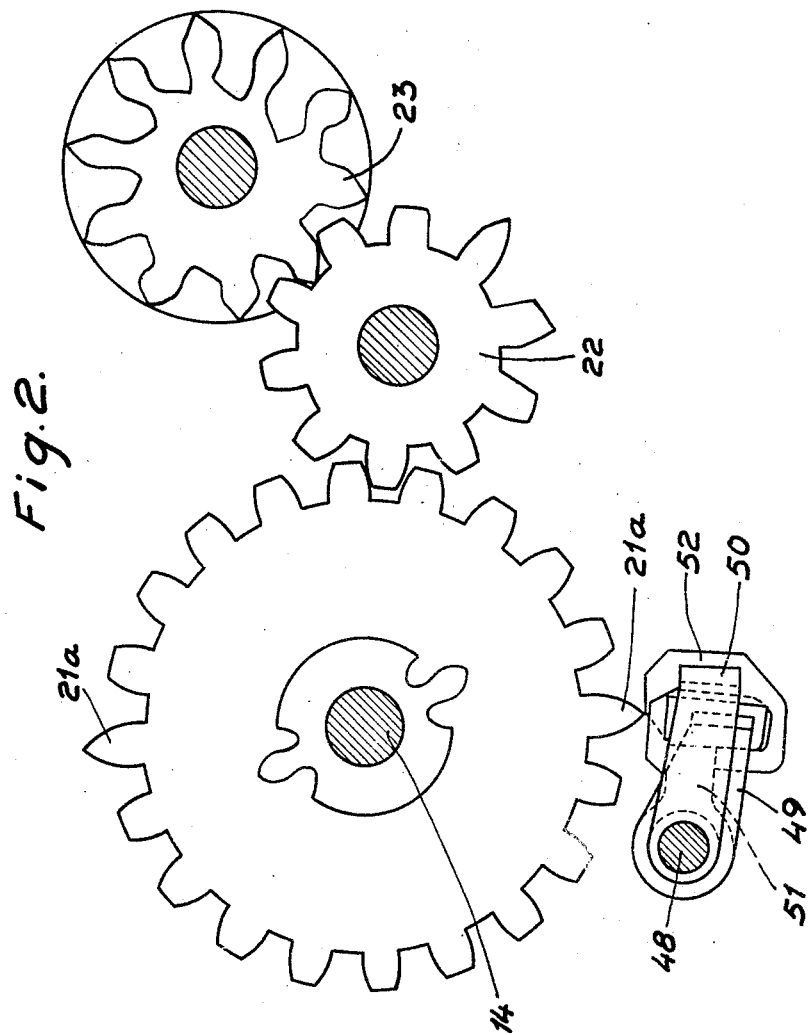

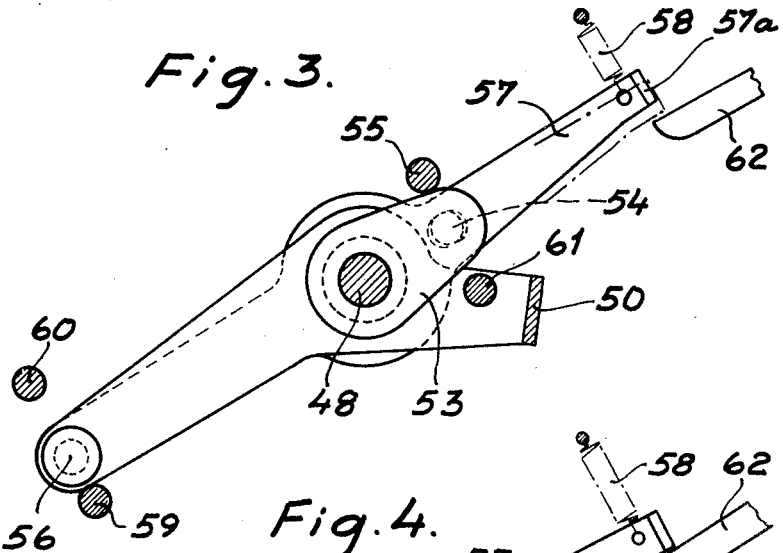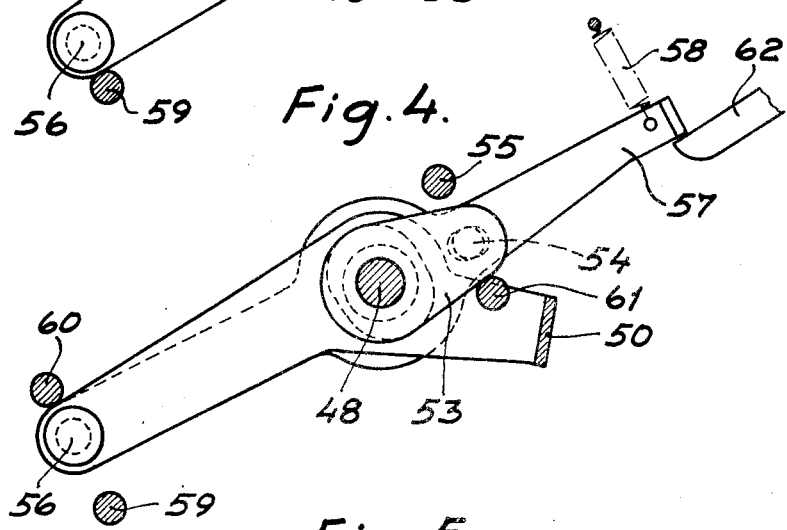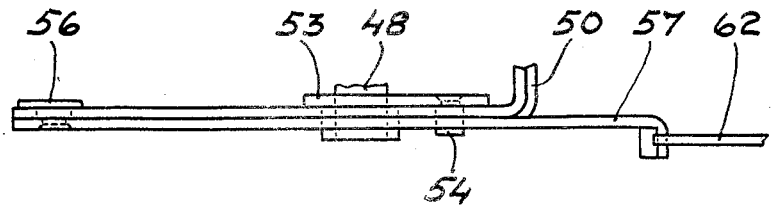

Patented May 22, 1951

2,553,884

UNITED STATES PATENT OFFICE 2,553,884

OVERDRAFT SENSING AND CONTROL MECHANISM FOR CRAWL-CARRY ACCUMULATORS

Sture Toorell, Atvidaberg, Sweden, assignor to Aktiebolaget Facit, Atvidaberg, Sweden, a joint-stock company of Sweden Application April 26, 1948, Serial No. 23,254
In Sweden May 8, 1947

3 Claims. (Cl. 235—79)

This invention refers to a simple and reliable overdraft sensing and control device operable to control the cycle terminating and tabulating mechanisms of a calculating machine having a cyclically operable and ordinally shiftable actuator in order to perform automatic division when utilizing a calculating machine having an accumulator provided with tens transfer mechanism of the continuous or crawl carry type.

Theoretically, it is entirely possible to initiate the cycle determination and tabulation of the actuator necessary to perform division by means of a triggering action provided by the passage of the overflow order of the accumulator from the digital value zero to the digital value 9, i. e., upon the accumulator "going negative." However, in registers with tens transfer mechanism of the crawl type the rate of movement of the accumulator wheels of the higher denominational orders is very low and consequently both the amount and the rate of movement are such that a triggering action is unreliable.

In prior calculating machines having tens transfer mechanisms of the crawl type and provided with arrangements for effecting automatic division, this difficulty of initiating such stopping and reversing of the driving mechanism and stepshifting of the actuator has been overcome; the mechanism utilized has, however, been extremely complicated and consequently difficult to assemble and not reliable. The chief purpose of the present invention is to provide a very simple and reliable device for performing the overdraft sensing and control functions mentioned above during automatic division operations.

This invention is based on the principle that the overdraft is sensed, whenever the numeral wheel of the highest denomination of the products register in which the actuator is at the moment operating (hereinafter called denomination A) and the numeral wheel of the next higher denomination (hereinafter called denomination B) pass through the digit 0 at the same time i. e. at the very moment when the numerical value in the register changes from positive to negative, or vice versa.

The operations of division, per se, may therefore, without difficulty, be effected either exclusively by use of minus revolutions of the actuator with a revolution of correction in every position of calculation (denomination), or by use of alternating minus and plus revolutions, for instance according to U. S. Patent No. 2,398,286.

Another purpose of this invention is to sense two denominations simultaneously and to render the overdraft mechanism effective only when the numeral wheels of those two denominations simultaneously pass through "0."

In operations of division this means that the numeral wheel of the denomination next higher than that denomination in which the calculation is effected (i. e. the actuator operates) in this moment, approaches the numeral value "0" at a speed which is one tenth of the speed of the next lower numeral wheel. Assuming that the angle of rotation within which the numeral wheels give off an impulse, has the same size for both of the wheels, the wheel of the higher denomination will give off its impulse during a period which is ten times as long as that of the wheel of the lower denomination. For this reason the wheel of the higher denomination will relatively well in advance release what may be termed the first half of the throw-out impulse. In other words the throw-out impulse is thus "prepared." When thereafter the numeral wheel of the highest denomination, in which the calculating operation is just taking place, also passes through "0," its impulse is added to that prepared impulse (held in abeyance), and those two impulses will together release the throw-out mechanism. Due to the fact that the two impulses, which in themselves and taken separately are very small, are thus "added," the resulting impulse will be big enough for allowing a secure and safe registration of the change of sign (from + to —, or vice versa), just when it happens.

The two throw-out impulses may certainly be added in different ways, but the embodiment shown and described below embodies a very compact and reliable, wholly mechanic device for adding the two impulses to one single impulse, which in its turn releases the throw-out for the division. Such release may be effected for instance by the actuation of a release member of the well-known construction which is used in ordinary pin-wheel machines having mechanisms for automatic division.

An especially suitable, simple and reliable embodiment of the invention shall now be described in detail in connection with attached drawings, in which Fig. 1 shows a diagrammatic perspective view of the overdraft control mechanism, the elements being shown spaced apart axially for the sake of clarity. Fig. 2 shows an end view of certain details in Fig. 1. Figs. 3 and 4 show end views of elements of the overdraft control mechanism in two different positions, and Fig. 5 shows a view of the same elements, seen from below.

In a register with continuous tens transfer during parts of the revolution of the numeral wheel, which register may for example be constructed according to the now abandoned U. S. application Serial No. 22,414 filed April 21, 1948, tooth wheels 21 are connected to the numeral wheels 23 via transmission or intermediate wheels 22 in such a way, that any rotation of one of the numeral wheels 23 always conforms to a corresponding rotation of the toothed wheel 21, coupled to said numeral wheel. In the embodiment shown the ratio of transmission (gearing) is so selected, that the toothed wheel 21 is rotated one half of the revolution of the corresponding numeral wheel, i. e. the numeral wheels are each provided with ten teeth and the toothed wheels 21 are each provided with twenty teeth, two of diametrically opposed teeth 21a being of greater length than the others. These elongated teeth 21a constitute the impulse giving members in the register cooperable with the overdraft sensing devices, and occupy a pre-determined position when the numeral wheel passes through its zero position, this pre-determined position being felt by the following devices in the denominations A and B.

To a shaft 48, situated below the main shaft 14 of the register, an inner U-shaped member 49 is secured while another outer U-shaped member 50 is loosely journalled on the same shaft. A feeling or sensing hook 51 is slidably journalled on the shaft 48, said hook being provided with a slot, enclosing the inner U-shaped member 49, causing said member to be actuated by the hook. On the shaft 48 another feeling or sensing hook 52 is displaceably journalled, said hook being provided with both a slot enclosing the outer U-shaped member 50 and also an opening for the inner U-shaped member 49, said opening being big enough to allow said inner member 49 to swing freely without interference from the hook 52. In operations of division the hooks 51 and 52 are moved axially by means of drivers (dogs), not shown, in such a way, that the hook 51 is in alignment with the toothed wheel 21 in the denomination A and the hook 52 is in alignment with the corresponding toothed wheel 21 in the denomination B. These drivers may for example consist of fork-shaped guide members, and may be arranged on the carriage of an axially movable actuator.

At one end of the above mentioned shaft 48 an arm 53 is fixed, the counterclockwise rotation of which is limited by the stationary checking or stop pin 55. To the arm 53 a pin 54 is fixed which engages a slot in another arm 57, which by means of a pin 56 or the like is journalled on the elongated part of the U-shaped member 50. The arm 57 is provided with a central aperture for the shaft 48, which aperture has a greater diameter than the shaft, thus allowing the arm 57 to swing freely through a limited angle.

A spring 58 tends to pull the arm 57 and thus also the U-shaped member 50 against a checking pin 59 while at the same time the arm 53 is pressed against the stationary checking pin 55 by means of the pin 54. The deflection of the U-shaped member 50 is limited by the stationary checking pin 60 and the deflection of the arm 53 by another stationary pin 61.

The arm 57 has a bent part 57a, which at the swinging of the arm actuates a control member 62, which may for example be constructed as the corresponding element 86 in the U. S. Patent No. 2,488,011, granted November 15, 1949, operable as therein disclosed to terminate cycling of the actuator and initiate tabulation thereof.

When the numeral wheel in the denomination A is the only one which passes through zero, the elongated tooth 21a forces down the hook 51, which then rotates in clockwise direction the inner U-shaped member 49, rigidly connected to the shaft 48. The rotary motion of said member is via the shaft 48 transferred to the arm 53, which then transfers the rotary motion to the arm 57 by means of the pin 54, thus causing said arm to swing around the pin 56 to the position indicated by dot and dash lines in Fig. 3. In this case the swinging motion is not sufficient to cause any actuation of the control member 62.

When the numeral wheel in the denomination B is the only one which passes through zero, the corresponding elongated tooth 21a presses down the hook 52, which then imparts a clockwise rotary motion to the outer U-shaped member 50. This motion is transferred to the arm 57 via the pin 56, causing said arm to swing clockwise on the pin 54. The bent part 57a will then again assume the position indicated in dot and dash lines in Fig. 3, and, as before, the control member 62 is not actuated.

Thus, no cycle termination and tabulation of the actuator is initiated when only one of the hooks is actuated on.

If, on the contrary, both of the hooks 51 and 52 are simultaneously pressed down, i. e. when the numeral wheels of both the denominations A and B at the same time pass through zero, the arm 57 will be rocked clockwise on the pin 56 and also—still clockwise, on the pin 54. These two rocking motions will then be added to one another, and consequently the motion of the bent part 57a will be so great, that the control member 62 will be actuated and will initiate stopping and stepshifting of the actuator; see the position shown in Fig. 4.

In order to make operations of division possible in the highest denomination of the register (accumulator), said register is provided with an overflow order outside of the highest real denomination. This overflow order is a direct continuation of the other denominations, but ends with the impulse giving toothed wheel 21, thus lacking a corresponding numeral wheel.

On tabulation from the next highest denomination the hook 52 is moved to a position to the left outside of the register proper and below the impulse giving toothed wheel 21, belonging to the overflow order. As soon as the numeral wheel of the highest real denomination passes through zero, the toothed wheel 21 of the overflow order will also give off an impulse, that is both of the hooks 51 and 52 are pressed downward, thus operating control lever 62 for initiating the stopping and step shifting of the actuator to the next lower denomination. The hooks 51 and 52 and their drivers then follow the movable carriage, so that the hook 52 now is moved to the position in alignment with the toothed wheel 21 of the highest real denomination and the hook 51 to a position below the corresponding wheel in the next lower denomination, whereafter the stop and step shifting impulses are given off in the manner described above.

The above is merely an embodiment of the invention; other embodiments are, of course, possible within the idea of the invention.

I claim:

1. In a calculating machine having a crawl-carry accumulator, an ordinally shiftable and cyclically operable differential actuator, and division control means operable to terminate the cyclic operation of the actuators and initiate a tabulated shift thereof, an overdraft sensing and control mechanism comprising, in combination, toothed wheels individually associated with the numeral wheels of the accumulator, projections on said toothed wheels, a rockable shaft extending axially along said accumulator, two rockable U-shaped members mounted on said shaft, one of said members being rotatable with said shaft and the other rotatable on said shaft, two sensing hooks mounted on said shaft, each of said hooks engaging one of said U-shaped members and also normally engaging ordinally adjacent ones of said toothed wheels to be acted upon by said projections, when said wheels pass through zero position, the one of said U-shaped members which is secured to said shaft having at one of its ends an arm carrying a control lever pivotally mounted on said pin and adapted to operate said division control means, a spring urging said control lever to a normal inoperative position, an arm secured to said loosely mounted U-shaped member, said arm carrying a pin on which said control lever is also pivotally mounted at the side of said shaft opposite said first pivotal mounting and a slot in said control lever through which said shaft extends whereby limited movement of said control lever occurs upon operation of either of said U-shaped members but sufficient movement to operate said division control means occurs only when the U-shaped members are moved concurrently to impart pivotal movement about both said pins to said control lever.

2. In a calculating machine having a crawl-carry accumulator, an ordinally shiftable and cyclically operable differential actuator, and division control means operable to terminate the cyclic operation of the actuators and initiate a tabulated shift thereof, an overdraft sensing and control mechanism comprising, in combination, toothed wheels individually associated with the numeral wheels of the accumulator, projections on said toothed wheels, a rockable shaft extending axially along said register, two U-shaped members on said shaft, one of said members being secured to said shaft and the other being rotatably mounted thereon, a pair of sensing hooks mounted on said shaft and engaging said projections on ordinally adjacent ones of said numeral wheels, said hooks being shiftable with the actuator to engage one thereof with the numeral wheel of highest real denominational order in which calculating is performed, and the other with the numeral wheel of an overflow order, said sensing hook engaged by projections on the highest real denominational order of the numeral wheel engaging with that one of the U-shaped members which is secured to said shaft, said sensing hook engaged by projections on the numeral wheel of the overflow order engaging said loosely mounted U-shaped member, an arm fixed to said shaft, a pin fixed in said arm, a control lever mounted on said pin for pivotal movement thereabout, an arm extending from said loosely mounted U-shaped member on the opposite side of said shaft from said first-mentioned arm, a pin extending from said last-mentioned arm, means pivoting said control lever on said pin, resilient means for holding said control lever in normal position and said sensing hooks against their respective wheels, and means operated by said control lever for operating said division control means only when said control lever has been pivotally moved about both said pins in the same direction.

3. In a calculating machine having a crawl-carry accumulator, an ordinally shiftable and cyclically operable differential actuator, and division control means operable to terminate the cyclic operation of the actuators and initiate a tabulated shift thereof, an overdraft sensing and control mechanism comprising, in combination, toothed wheels individually associated with the numeral wheels of the accumulator, projections on said toothed wheels, a rockable shaft extending axially along said register, two U-shaped members on said shaft, one of said members being secured to said shaft and the other being rotatably mounted thereon, a pair of sensing hooks mounted on said shaft and engaging said projections on ordinally adjacent ones of said numeral wheels, said hooks being shiftable with the actuator to engage one thereof with the numeral wheel of highest real denominational order in which calculating is performed, and the other with the numeral wheel of an overflow order, said sensing hook engaged by projections on the highest real denominational order of the numeral wheel engaging with that one of the U-shaped members which is secured to said shaft, said sensing hook engaged by projections on the numeral wheel of the overflow order engaging said loosely mounted U-shaped member, an arm fixed to said shaft, a pin fixed in said arm, a control lever mounted on said pin for pivotal movement thereabout, an arm extending from said loosely mounted U-shaped member on the opposite side of said shaft from said first-mentioned arm, a pin extending from said last-mentioned arm, means pivoting said control lever on said pin, a pair of stationary stops for each of said arms, said stops limiting position of their respective arms in both directions, resilient means for holding said control lever in normal position, said resilient means also holding each of said arms against one of its pair of stops and said sensing hooks against their respective wheels, and means operated by said control lever for initiating reversing and step-shifting of the actuator only when said control lever has been pivotally moved about both said pins in the same direction to place each said arms against the other of its pair of stops.

STURE TOORELL.

REFERENCES CITED

The following references are of record in the file of this patent:

UNITED STATES PATENTS

| Number | Name | Date |
|---|---|---|
| 2,106,273 | Fleming | Jan. 25, 1938 |
| 2,176,205 | Chase | Oct. 17, 1939 |
| 2,211,736 | Avery | Aug. 13, 1940 |
| 2,339,616 | Chase | Jan. 18, 1944 |
| 2,398,286 | Carlstrom et al. | Apr. 9, 1946 |